United States Patent

Pahk et al.

[11] Patent Number: 6,005,669
[45] Date of Patent: Dec. 21, 1999

[54] NON CONTACT MEASURING METHOD FOR THREE DIMENSIONAL MICRO PATTERN IN MEASURING OBJECT

[75] Inventors: Heui Jae Pahk, Na-404, Kyosu Apt., 244-2, Bongchun-dong, Kwanak-ku, Seoul; Sung Wook Cho, 104-506, Dongnam Apt., 536, Younsu-1-dong, Younsu-ku, Incheon; Woo Jung Ahn, Seoul, all of Rep. of Korea

[73] Assignees: Heui Jae Pahk, Seoul; Sung Wook Cho, Incheon, both of Rep. of Korea

[21] Appl. No.: 09/065,493

[22] Filed: Apr. 24, 1998

[30] Foreign Application Priority Data

Oct. 24, 1997 [KR] Rep. of Korea ............... 97-54892

[51] Int. Cl.$^6$ .............. G01B 11/24; G01B 11/00; G01B 11/30; G01B 11/02
[52] U.S. Cl. ............ 356/376; 356/359; 356/371; 356/369; 356/357; 356/124; 356/372
[58] Field of Search .................... 356/376, 372, 356/371, 359, 369, 357, 124, 360

[56] References Cited

U.S. PATENT DOCUMENTS

| 4,650,330 | 3/1987 | Fujita | 356/359 |
|---|---|---|---|
| 4,673,818 | 6/1987 | Guerra | 356/124 |
| 4,732,483 | 3/1988 | Biegen | 356/359 |
| 4,869,593 | 9/1989 | Biegen | 356/359 |
| 4,978,862 | 12/1990 | Silva et al. | 356/369 |
| 5,255,067 | 10/1993 | Carrabba et al. | 356/301 |
| 5,355,221 | 10/1994 | Cohen et al. | 356/376 |
| 5,489,984 | 2/1996 | Hariharan et al. | 356/360 |
| 5,535,005 | 7/1996 | Mukherjee-Roy et al. | 356/371 |
| 5,585,921 | 12/1996 | Pepper et al. | 356/357 |
| 5,877,860 | 3/1999 | Borden | 356/376 |

Primary Examiner—Frank G. Font
Assistant Examiner—Roy M. Punnoose

[57] ABSTRACT

A non-contacting measuring method for three dimensional micro pattern in a measuring object is disclosed. Three dimensional micro pattern of the surface of the measuring object is measured using blur of light. For measurement, a mechanism of an optical window with a slit is inserted between light source and the measuring object. The blurred image is captured by charge coupled device sensor based image frame grabber, and is analyzed in personal computers. All the values of the relative height differences are obtained in overall scanning measurement area of the measuring object. The relative height differences are the distances from the reference position to the other positions. The reference position is selected when its image is sharp in focus on the screen. At this time, images of the other positions except the reference position are blurred out of focus on the screen. Also, from the law of geometric optics and the geometric similarity of triangles, the relation equation between the height difference and the ratio of blurred image size to sharp image size can be constructed. When the size of the image of the reference position and the sizes of the images with the blurred image of the other positions are measured, all the height differences between the reference position and the other position can be calculated if the coefficients of the relation equation are evaluated.

5 Claims, 10 Drawing Sheets

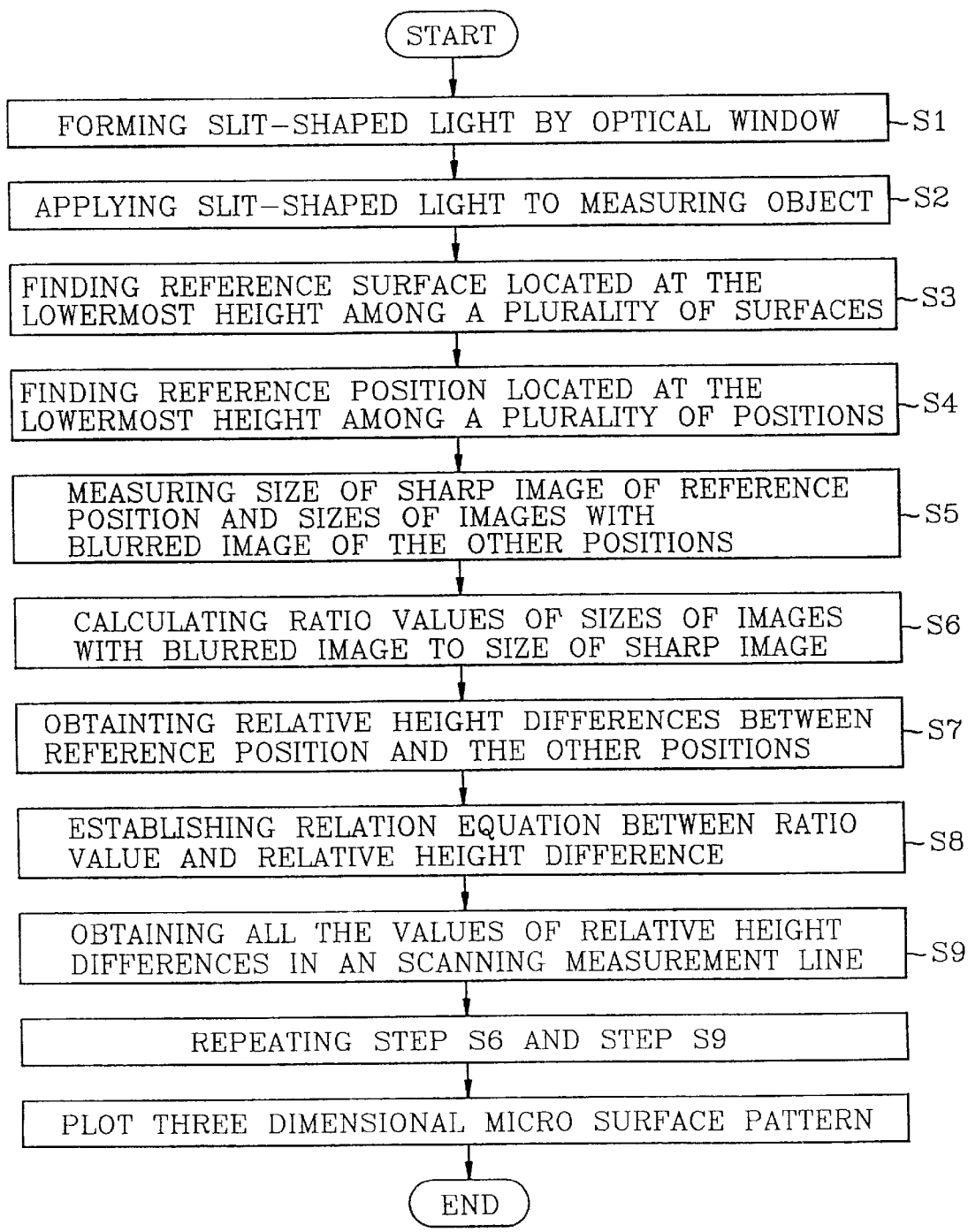

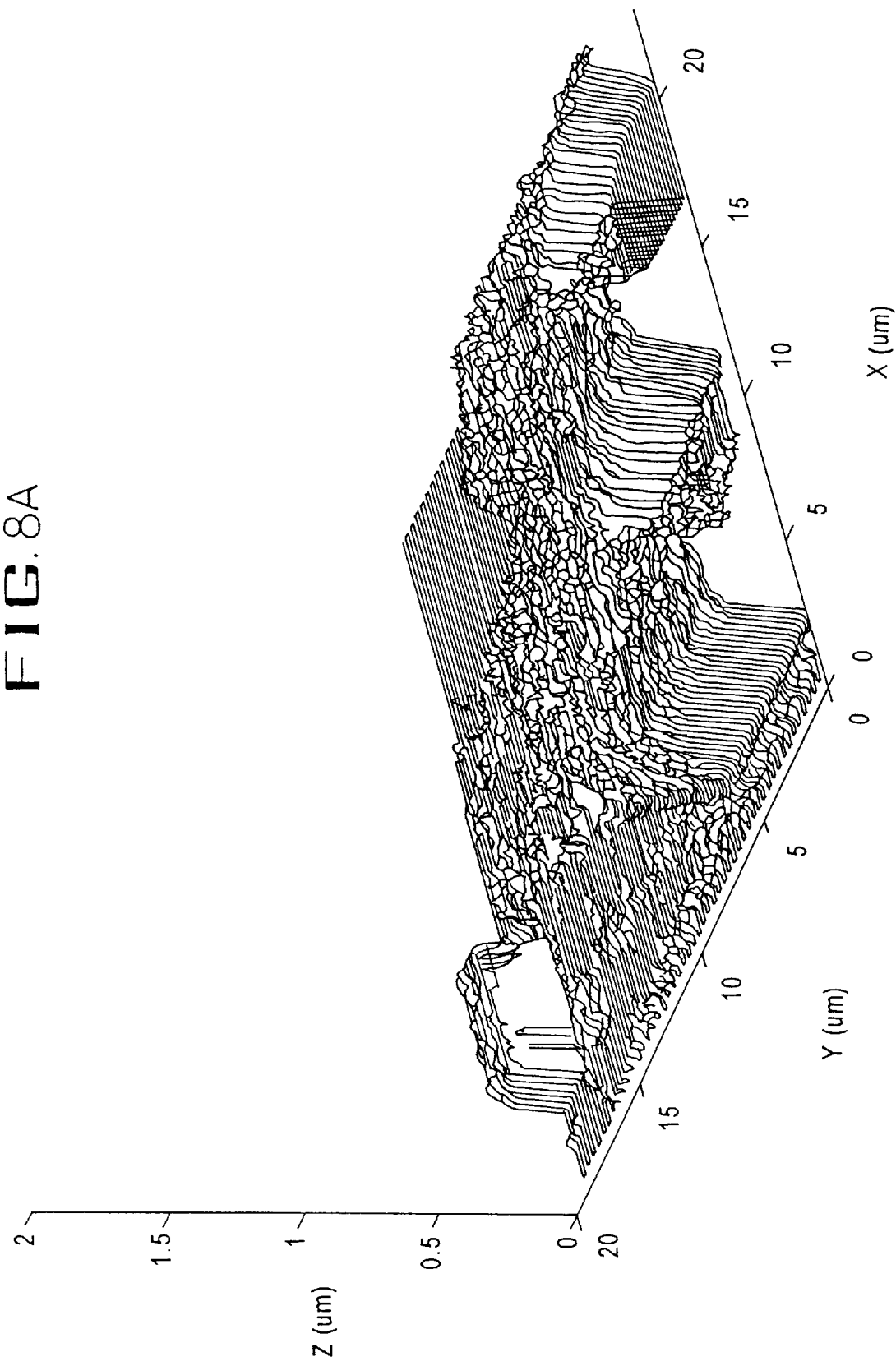

NON CONTACT MEASURING METHOD FOR THREE DIMENSIONAL MICRO PATTERN IN MEASURING OBJECT

FIELD OF THE INVENTION

The present invention relates to a measuring method for three dimensional micro pattern in a measuring object, and more particularly to a non-contacting measuring method for three dimensional micro pattern in a measuring object using an optical window and blurred images.

In recent years, quantitative measurement of three dimensional surface pattern has been increasingly applied in many science and engineering fields and there have been several methods for the surface pattern measurement, for example, stylus based method, auto-focus based method, interferometric method, SEM(Scanning Electronic Microscope), and SPM(Scanning Probe Microscope), etc. Especially, in case of semiconductor wafer, three dimensional pattern characteristics such as depth profile of chemically processed IC pattern has been to be measured for the quality control of wafer manufacturing processes.

However, the aforedescribed known prior arts have some limitations in applications and sometimes necessitate troublesome measuring environment. The SEM, which is one of the most precise measuring method, has the severe drawbacks and problems in that it causes inconvenience due to wafer destruction and vacuum environment.

SUMMARY OF THE INVENTION

The present invention is directed to overcome the drawbacks and problems as set forth above.

It is an object of the present invention to provide a non-contacting measuring method for three dimensional micro pattern in a measuring object using an optical window and blurred images, giving in high measuring accuracy and simple measuring environment.

It is another object of the present invention to provide a non-contacting measuring method for three dimensional micro pattern in a measuring object using an optical window and blurred images, giving quantitative measurement of the surface of the measuring object with few nanometer resolution of depth profile.

According to the present invention, these objects are achieved. There is provided a non-contacting measuring method for three dimensional micro pattern in a measuring object comprising the steps of: (a) forming light emitted from a source into slit-shaped light by means of an optical window; (b) applying the slit-shaped light to a first scanning measurement line with a micro width of the measuring object with a plurality of surfaces which have step heights wherein each of the surfaces has three dimensional micro depth profile; (c) finding a reference surface among the surfaces by passing the light reflected from the surfaces through a lens and capturing images of the surfaces on a screen wherein the reference surface is in focus on the screen; (d) finding a reference position in the reference surface whose image is sharp in focus on the screen wherein images of the other positions except the reference position are blurred out of focus on the screen; (e) measuring a size of the sharp image corresponding to the reference position and sizes of the images with blurred image corresponding to the other positions; (f) calculating ratio values of the sizes of the images with the blurred image to the size of the sharp image corresponding to the reference position; (g) obtaining relative height differences between the reference position and the other positions; (h) establishing a relation equation between ratio value and relative height difference by the ratio values of the sizes of the images with the blurred image to the size of the sharp image and the relative height differences between the reference position and the other positions wherein the relation equation between the ratio value and the relative height difference is given as $\delta = C_1 - C_2/k$, where $C_1$ a distance from the lens to the reference position of the reference surface and $C_2 = a \cdot b_2 / b_1$ when $b_1$ is a distance from the sharp image to the lens and $b_2$ are distances from the blurred image to the lens; (i) obtaining all the values of the relative height differences between the reference position and the other positions in the first scanning measurement line by the established relation equation between the ratio value and the relative height difference; and (j) repeating said steps (f) and (i) while moving the measuring object until obtaining all the values of the relative height differences in overall scanning measurement area of the measuring object.

There is also provided a non-contacting measuring method for three dimensional micro pattern in a measuring object comprising the steps of: (a) forming light emitted from a source into slit-shaped light by means of an optical window; (b) applying the slit-shaped light to a first scanning measurement line with a micro width of the measuring object; (c) finding a reference position by passing the light reflected from the measuring object through a lens and capturing images on a screen whose image is sharp in focus on the screen wherein images of the other positions except the reference position are blurred out of focus on the screen; (d) measuring a size of the sharp image corresponding to the reference position and sizes of the images with blurred image corresponding to the other positions; (e) calculating ratio values of the sizes of the images with the blurred image to the size of the sharp image corresponding to the reference position; (f) obtaining relative height differences between the reference position and the other positions; (g) establishing a relation equation between ratio value and relative height difference by the ratio values of the sizes of the images with the blurred image to the size of the sharp image and the relative height differences between the reference position and the other positions wherein the relation equation between the ratio value and the relative height difference is given as $\delta = C_1 \ C_2/k$, where $C_1$ a distance from the lens to the reference position of the reference surface and $C_2 = a \cdot b_2 / b_1$ when $b_1$ is a distance from the sharp image to the lens and $b_2$ are distances from the blurred image to the lens; and (h) obtaining all the values of the relative height differences between the reference position and all the other positions in overall scanning measurement area by the established relation equation between the ratio value and the relative height difference.

The three dimensional micro pattern of the surface of the measuring object is measured using blur of light. For height measurement, a mechanism of an optical window is inserted between light source and the measuring object. The blurred image is captured by charge coupled device sensor based image frame grabber, and is analyzed in personal computers.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 4 is a flow chart of the measuring method according to the present invention;

FIG. 8A to FIG. 8B are three dimensional graphs illustrating measurement results of the relative height differences over the surfaces of the measuring objects, respectively.

DETAILED DESCRIPTION OF THE PREFERRED EMBODIMENT

This invention will be described in further detail by way of embodiment with reference to the accompanying drawings.

Figure 1:
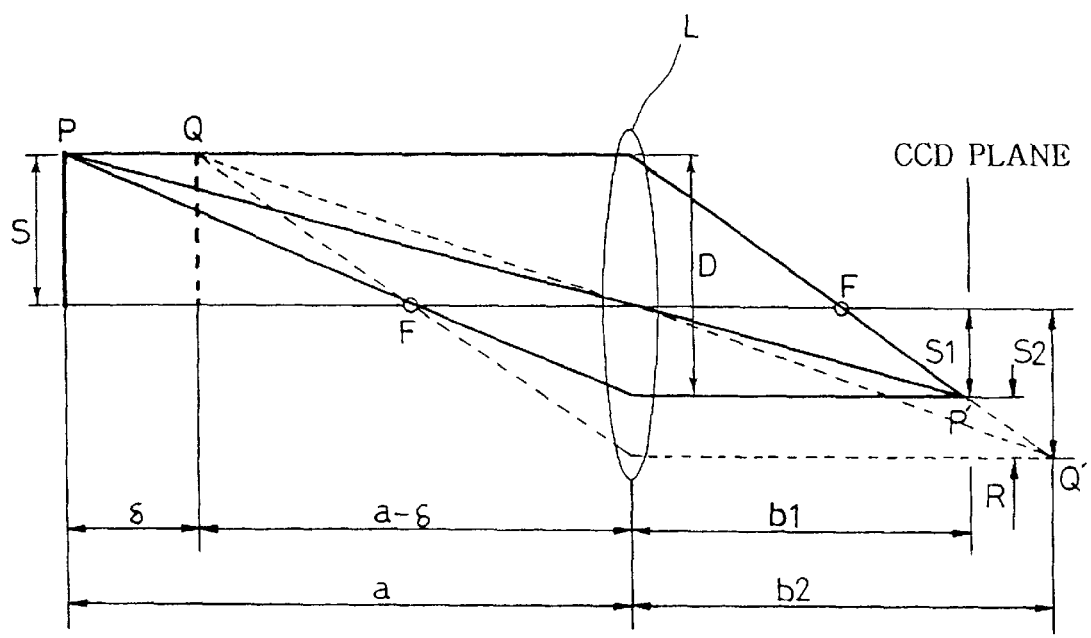
FIG. 1 is a graph illustrating a basic principle applied to a measuring method according to the present invention.

Referring to FIG. 1, FIG. 1 shows the basic principle using blur of light for height measurement according to the present invention. Let P and Q be objects having $\delta$ height difference. When the objects P and Q are transformed to image through a lens L, images I' and Q' are formed at each focal plane, whose distances are $b_1$ and $b_2$ from the lens L, respectively. When a charged coupled device (hereinafter referred as to "CCD") is located at the focal plane of the object P which is the distance b1 away from the lens L, a sharp image of size $S_1$ and a blurred image of size R are formed at the focal plane of the object P. The blurred image of the object Q is traditionally ignored or avoided, however, the blurred image is fully used for the height measurement according to the present invention.

From the law of geometric optics, the following two equations are derived.

For the object P, $$\frac{1}{a} + \frac{1}{b_1} = \frac{1}{f} \qquad (1)$$

For the object Q, $$\frac{1}{a-\delta} + \frac{1}{b_2} = \frac{1}{f} \qquad (2)$$

where f is the focal length of the lens L.

Also, from the geometric similarity of triangles, $$a:b_1 = S:S_1 \qquad (3)$$

$$a-\delta:b_2 = S:S_2 \qquad (4)$$

where S is the size of the object.

From eqns. (3) and (4), the relationship between the height difference $\delta$ and the blurred image size R can be constructed. That is, $$\delta = a - \frac{ab_2}{b_1 - \frac{S_2}{S_1}} = a - \frac{ab_2 S_1}{b_1(S_1 + R)} \qquad (5)$$

where a, $b_1$, and $b_2$ are the distances from the lens L, and $S_1$ is the image size of the object P, and R is the size of the blurred image.

Therefore, when the size $S_1$ of the object image P' and the size R of the blurred image Q' are measured, the height difference data $\delta$ can be calculated from eq. (5) if the coefficients are evaluated by the least squares technique.

Next, in order to obtain the accurate height data $\delta$, the calibration procedures are followed. Prior to calibration, eq. (5) can be arranged in simpler form, that is, $$\delta = C_1 - \frac{C_2}{k} \qquad (6)$$

where $C_1$ equals to a, $C_2$ is a $\cdot b_2/b_1$, and k is the ratio of image size $S_2/S_1$. Based on measured data set $(\delta_i, k_i)$ for measuring object, eq. (6) can be expressed as follows.

$$k\delta - C_1 k\ C_2 \qquad (7)$$

For N data sets, the sum of squares of error, E, is $$E = \Sigma(k_i \delta_i\ C_1 k_i + C_2)^2 \qquad (8)$$

where suffix i ranges from 1 to N.

Applying variational principle, $$\frac{\partial E}{\partial C_1} = 2\sum (k_i \delta_i - C_1 k_i + C_2)(-k_i) = 0$$

$$\frac{\partial E}{\partial C_2} = 2\sum (k_i \delta_i - C_1 k_i + C_1 k_2 + C_2)(1) = 0$$

Thus, $$C_1 = \frac{\begin{vmatrix} \sum k_i^2 \delta_i & -\sum k_i \\ -\sum k_i \delta_i & N \end{vmatrix}}{\begin{vmatrix} \sum k_i^2 & -\sum k_i \\ -\sum k_i & N \end{vmatrix}} = \frac{N\sum k_i^2 \delta_i - \sum k_i \sum k_i \delta_i}{N\sum k_i^2 - (\sum k_i)^2} \qquad (9)$$

$$C_2 = \frac{\begin{vmatrix} \sum k_i^2 & \sum k_i^2 \delta_i \\ -\sum k_i & -\sum k_i \delta_i \end{vmatrix}}{\begin{vmatrix} \sum k_i^2 & -\sum k_i \\ -\sum k_i & N \end{vmatrix}} = \frac{-\sum k_i \delta_i \sum k_i^2 \delta_i + \sum k^2 \delta_i \sum k_i}{N\sum k_i^2 - (\sum k_i)^2}$$

Therefore, coefficeints $C_1$, $C_2$ are evaluated using the least squares technique, completing relationship between the height difference data $\delta$ and the ratio of image size $k-(S_1+R)/S_1$.

Figure 2:
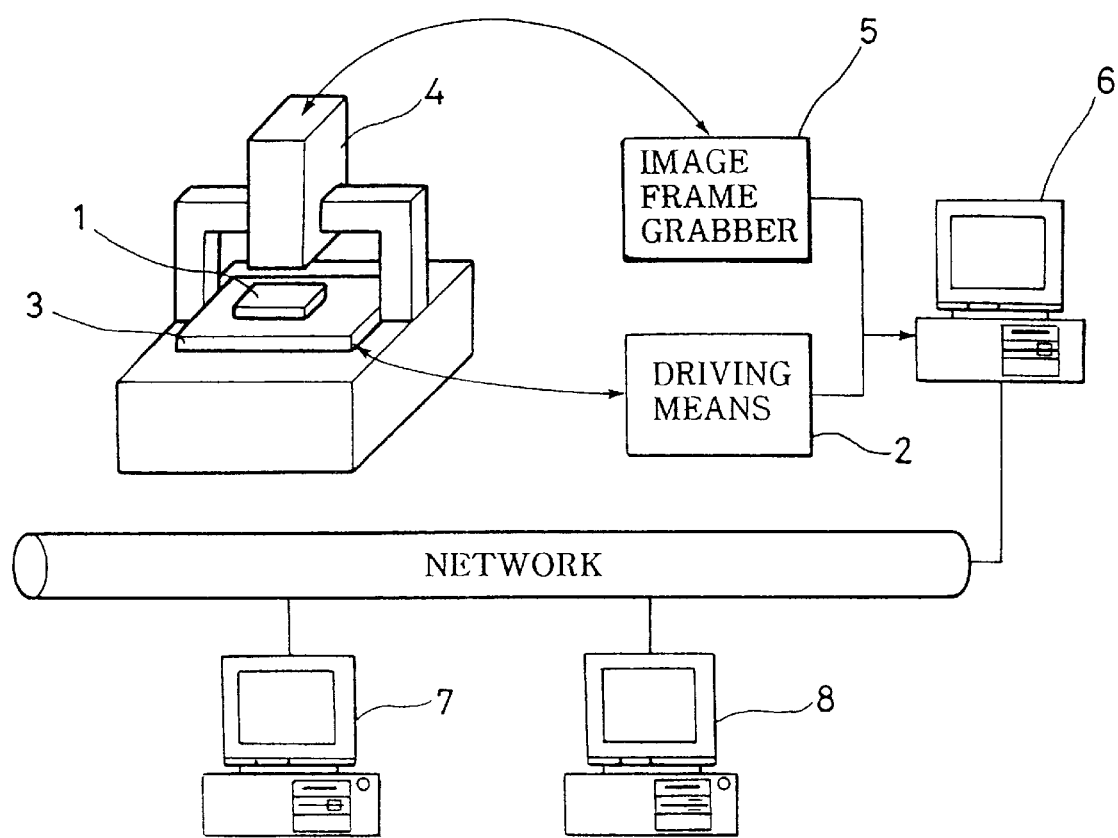
FIG. 2 is a schematic block diagram of a measuring system performing the measuring method according to the present invention.

Next, a measuring system for performing the measuring method according to the present is explained with reference to FIG. 2. A measuring object 1 is provided on a movable table 3 which is moved in x-y directions by a driving means 2. An optic part 4 is provided over the measuring object 4 and is connected to an image frame grabber 5 to capture CCD camera image. The driving means 2 and the image frame grabber 5 are connected to a computer 6 which is connected a CAD system 7 and a CAM system 8 via a network.

Figure 3A:
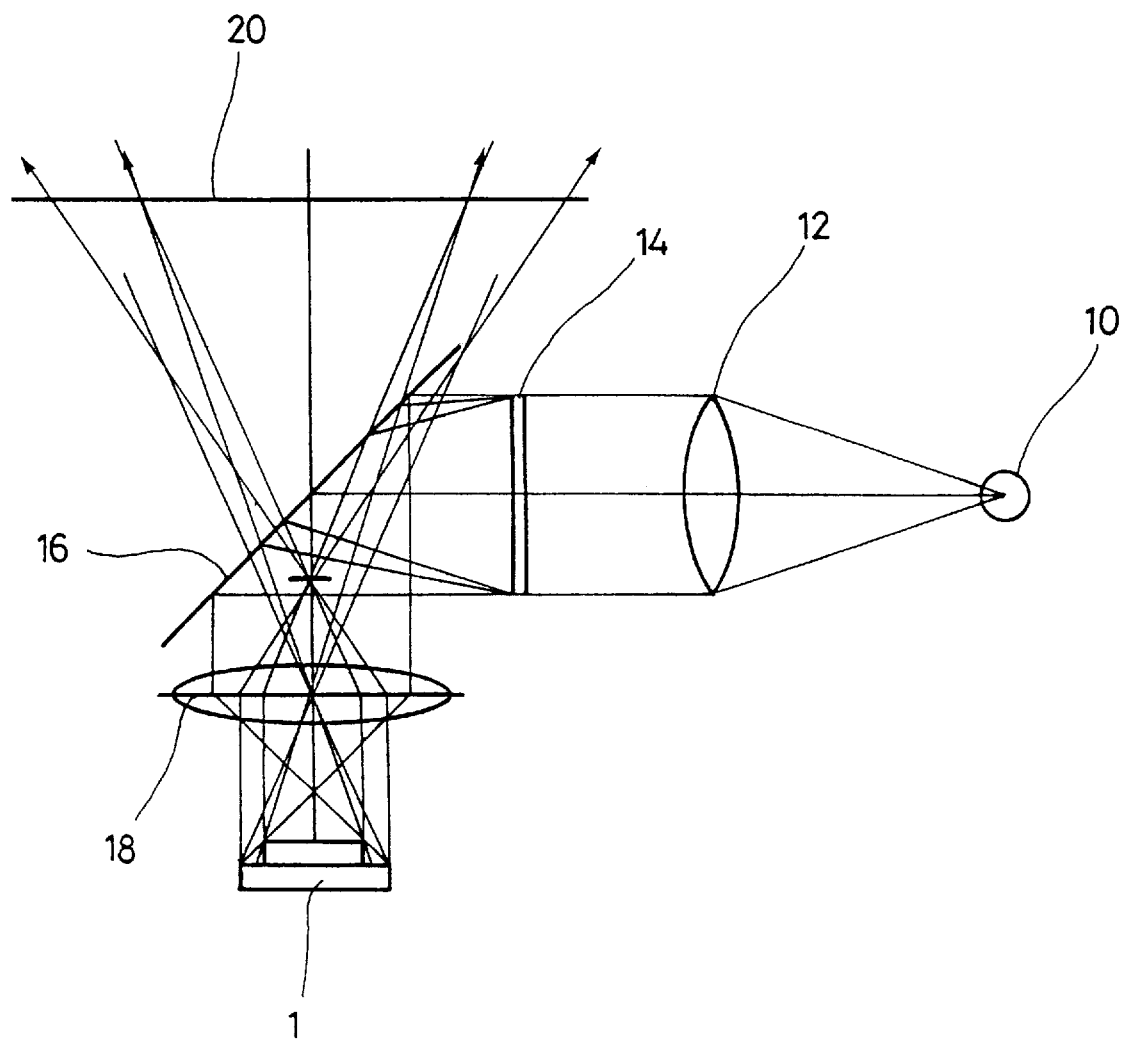
FIG. 3A is a schematic view showing an optical part of the measuring system in FIG. 2
Figure 3B:
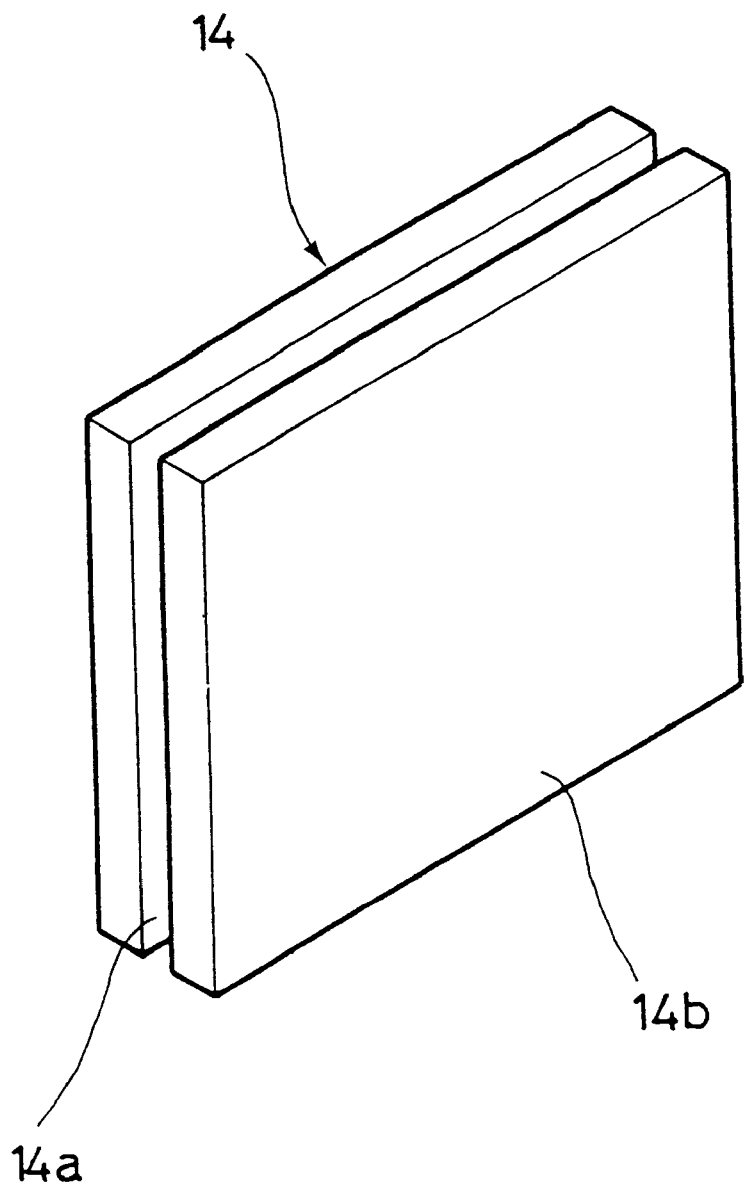
FIG. 3B is a schematic view chart illustrating an optical window of the optical part in FIG. 3A.
Figure 5:
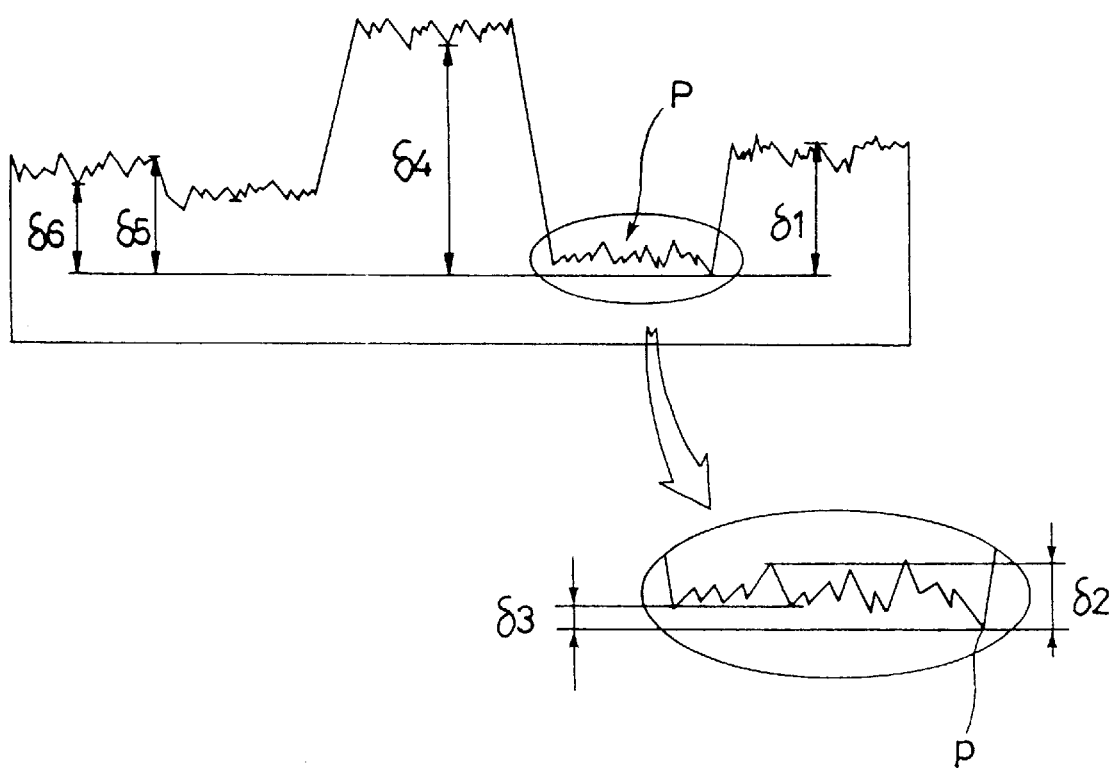
FIG. 5 is an enlarged fragmentary side view explaining relative height differences applied to the measuring method according to the present invention.
Figure 6A:
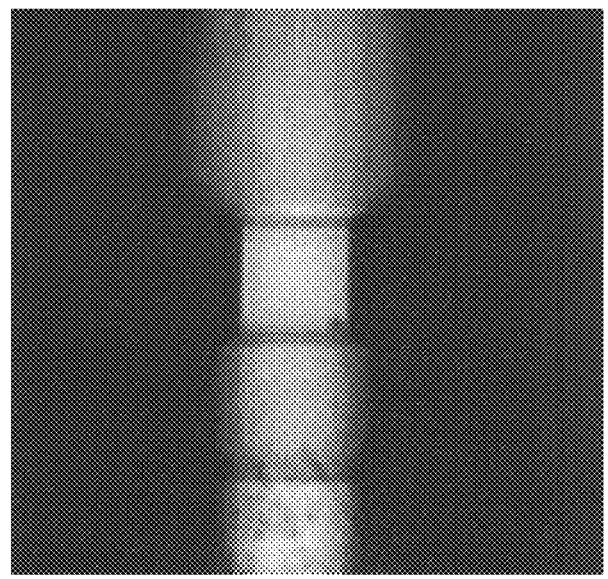
FIG. 6A and FIG. 6B are images of a plurality of surfaces of illustrative measuring objects in a scanning measurement line captured on a screen.
Figure 6B:
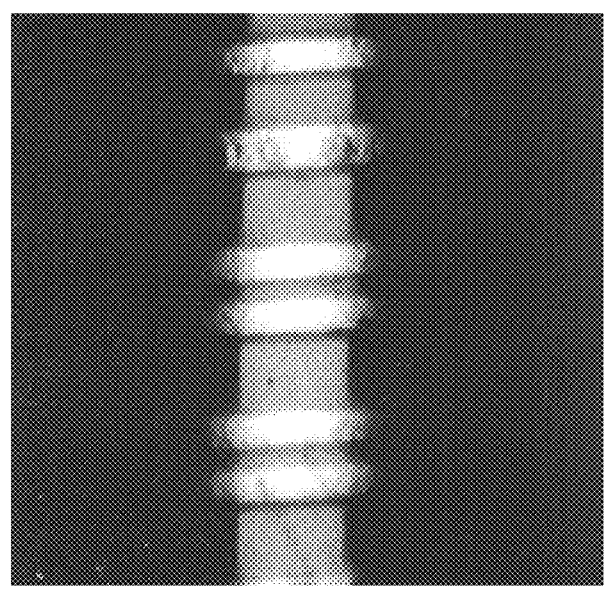

FIG. 3A shows the optical part 4. First, a light source 10 of which illumination is controlled by a light controller (not shown) is positioned at the right end portion. A condensing lens 12 is positioned in front of the light source 10 to condense the light emitted from the light source 10. An optical window 14 is provided in front of the condense lens 13 to make light slit and window the object size. Referring to FIG. 3B, the optical window 14 has a pair of plates 14b which are facing each other to form a slit 14b. The slit 14b passed only slit-shaped light therethrough. The slit-shaped light which is formed by the optical window 14 is sent to a half mirror 16 which is positioned in front of the optical window 14. The half mirror 16 partly transmits and partly reflects the slit-shaped light. The slit-shaped light reflected by the half mirror 16 passes through an object lens 18 which is positioned below the half mirror 16 and is applied to the measuring object 1. Although FIG. 3A shows two surfaces with a step height difference, it must be understood that the measuring object 1, in reality, has a plurality of surfaces with relative step height differences thereon. On the other hand, the slit-shaped light applied to the measuring object 1 is reflected and passes through the object lens 18 and the half mirror 16, and is captured on a screen 20, for example, a CCD plane, as shown in FIG. 1 and mentioned above with reference to FIG. 1. The captured images of the surfaces with the relative step height differences consist of a sharp image in focus and blurred images out of focus as can be seen in FIG. 6A and FIG. 6B.

From now on, the measuring method according to the present invention will be explained in detail in combination with basic principle of the optics and concept of the blurred image and the measuring system as described above.

First of all, the measurement of a measuring object which has a plurality of surfaces with relative step height differences in a scanning measurement line and also has a large number of positions with height differences in one surface is described. Here, the relative height difference δ is defined as a height difference from a single reference position existing in the measuring object to the other positions. Then, the reference position p becomes a basis determining all the relative height difference from the reference position p to the other positions in the measuring object. Therefore, when the image of the reference position p is sharp in focus on the screen 20 of FIG. 3A, images of the other positions except the reference position p will be blurred out of focus on the screen 20.

FIG. 4 illustrates a flow chart of the measuring method according to the present invention. Referring to FIG. 4, in step S1, slit-shaped light is formed by the optical window 14. Before passing through the optical window 14, the light emitted from the light source 10 is condensed by the condensing lens 12. The slit-shaped light reflected by the half mirror 16 passes through the object lens 18 and is applied to a first scanning measurement line of the measuring object 1 as step S2. The slit-shaped light applied to the measuring object 1 is reflected and pass through the object lens 18 and is captured on the screen 20. Then, a reference surface P, which is located at the lowermost height among a plurality of surfaces and whose image is in focus, is found in the first scanning measurement line by moving the screen 20 toward or apart from the object lens 18 in step S3. At this time, the images of the other surfaces except the reference surface P are blurred out of focus on the screen 20.

Thereafter, a reference position p, which is located at the lowermost height among a plurality of positions existing in the reference surface P and whose image is sharp in focus, is found by moving the screen 20 toward or apart from the object lens 18 in the same manner of finding the reference surface P in step S4. At this time, the images of the other positions except the reference position p are blurred out of focus on the screen 20. Therefore, the image of the only reference position p of the reference surface P is sharp in focus, and the images of the other positions of the reference surface P and all the positions in ovrall scanning measurement line are blurred out of focus. FIG. 6A and FIG. 6B show the image which is sharp in focus on the screen 20 and the images which are blurred out of focus on the screen 20 although the images cannot be accurately recognized in FIG. 6A and FIG. 6B. However, the reference position which is sharp in focus on the screen can be determined by well-known image frame grabber 5.

In step 5, a size of the sharp image corresponding to the reference position p and sizes of the blurred images corresponding to the other position are measured. In step 6, ratio values $k=S_2/S_1$ of the sizes of the images with the blurred image to the size of the sharp image corresponding to the reference position p are calculated to apply eq.(6). The data of the ratio values $k_i$ are obtained where i=1–n, n is the number of the data which are selected from a large number of positions. On the other hand, the size of the sharp image corresponding to the reference position p and the sizes of the images with the blurred image corresponding to the other positions can be accurately measured by pixel numbers of the image frame grabber 5.

Then, in step 7, the screen 20 is continuously moved upward or downward so that each of the blurred images is transformed to sharp in focus. When each of the blurred images is sharp in focus, each moving distance of the blurred images is measured by a well-known linear interferometer using laser to precisely measure moving distances of the blurred images. On the other hand, in order to make the blurred images sharp in focus, the screen 20 or the object lens 18 may be moved upward or downward. The moving distances of the blurred images become equal to the height differences $δ_i$ between the reference position p and the other positions with the blurred images. Therefore, data of the height differences $δ_i$ corresponding to data of the ratio values $k_i$ are obtained.

in step 8, values of coefficients $C_1$ and $C_2$ of eq.(9) are determined by the data of the ratio values $k_i$ and the data of the height differences $δ_i$. Therefore, a relation equation, that is eq.(9), between ratio value k and relative height difference δ is established by the determined values of coefficients $C_1$ and $C_2$.

Figure 7A:
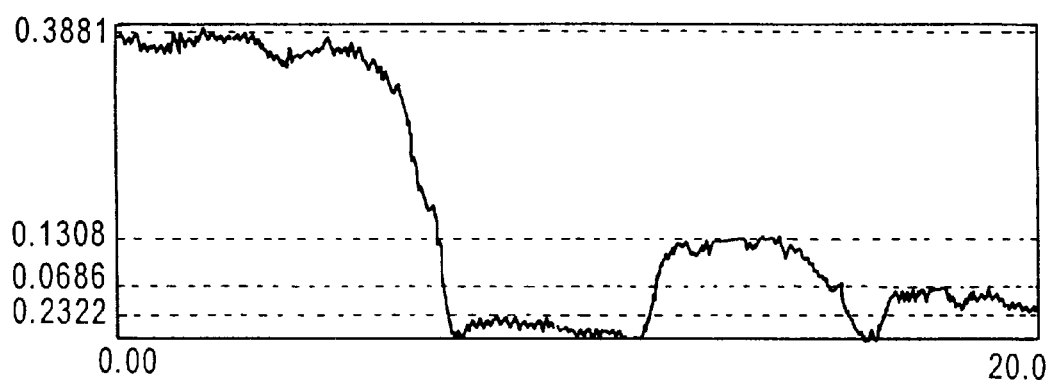
FIG. 7A and FIG. 7B are graphs illustrating measurement results of the relative height differences corresponding to FIG. 6A and FIG. 6B, respectively.
Figure 7B:
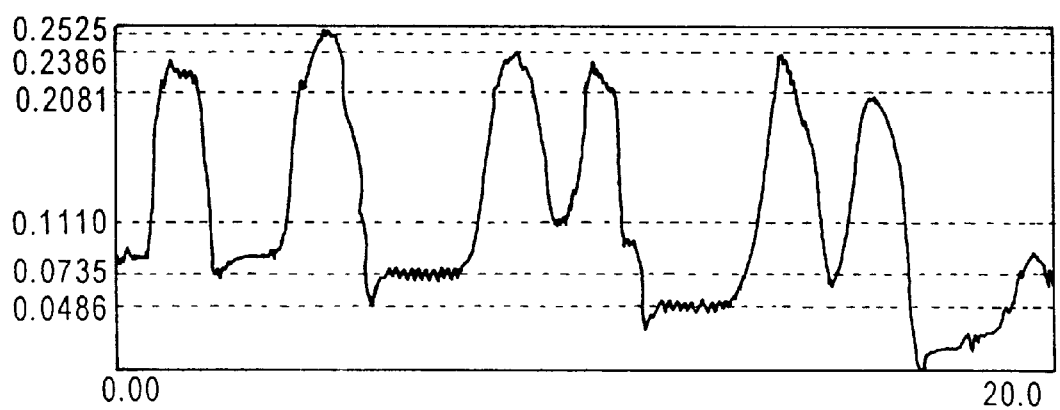

In next step 9, all the values of the relative height differences between the reference position and the other positions in the first scanning measurement line are obtained by the calculated ratio values of the sizes of the images with the blurred image to the size of the sharp image and the values of coefficients $C_1$ and $C_2$ in eq.(9). For example, FIG. 7A and FIG. 7B illustrate graphs of measurement results of the relative height differences corresponding to FIG. 6A and FIG. 6B, respectively. This step S9 provides the measurement characteristics of a line scanning that all the relative height differences are simultaneously obtained according to the scanning measurement line formed by the slit-shaped light applied to measuring object 1 by eq.(9).

By the steps S1~S9 as mentioned above, the relative height differences between the reference position p and the other position are measured in the first scanning measurement line only for a micro width, for example 0.1 μm, of the surface of the measuring object. Therefore, the steps S6 and S9 are repeated while moving the measuring object until obtaining all the values of relative height differences in overall scanning measurement area. In repeating the steps S6 and S9, all the values of the relative height differences between the reference position and all the other positions in the scanning measurement area are simultaneously obtained along each scanning measurement line of the measuring object by the established relation equation between the ratio value and the relative height difference and by a line-scanning technique.

On the other hand, only a reference position p can be found without finding a reference surface at the beginning as described above. Of course, the image of the reference position p is sharp in focus and the images of all the other positions in the measuring object are blurred out of focus. At this time, the other steps as described above are applied to obtain all the values of the relative height differences between the reference position and all the other positions in overall scanning measurement area by the established relation equation between the ratio value and the relative height difference.

Also, a master specimen where all the relative height differences are known can be employed to establish the relation equation between ratio value k and relative height difference δ with coefficients C1 and C2. In the case of the master specimen, a reference position whose image is sharp in focus on the screen is selected wherein all the other positions except the reference position are blurred out of focus. The relation equation between ratio value k and relative height difference δ with coefficients $C_1$ and $C_2$ can be obtained by the ratio values of the sizes of the images with blurred image to the size of the sharp image and the relative height differences between the reference position and the other positions which are known. To measure depth profiles of arbitrary measuring objects using the relation equation established by the master specimen, a reference position of the measuring object whose image is sharp in focus is selected and all the relative height differences are obtained by the established relation equation between the ratio value and the relative height difference and by ratio values of sizes of the images with blurred image to a size of the sharp image corresponding to the reference position.

Figure 8B:
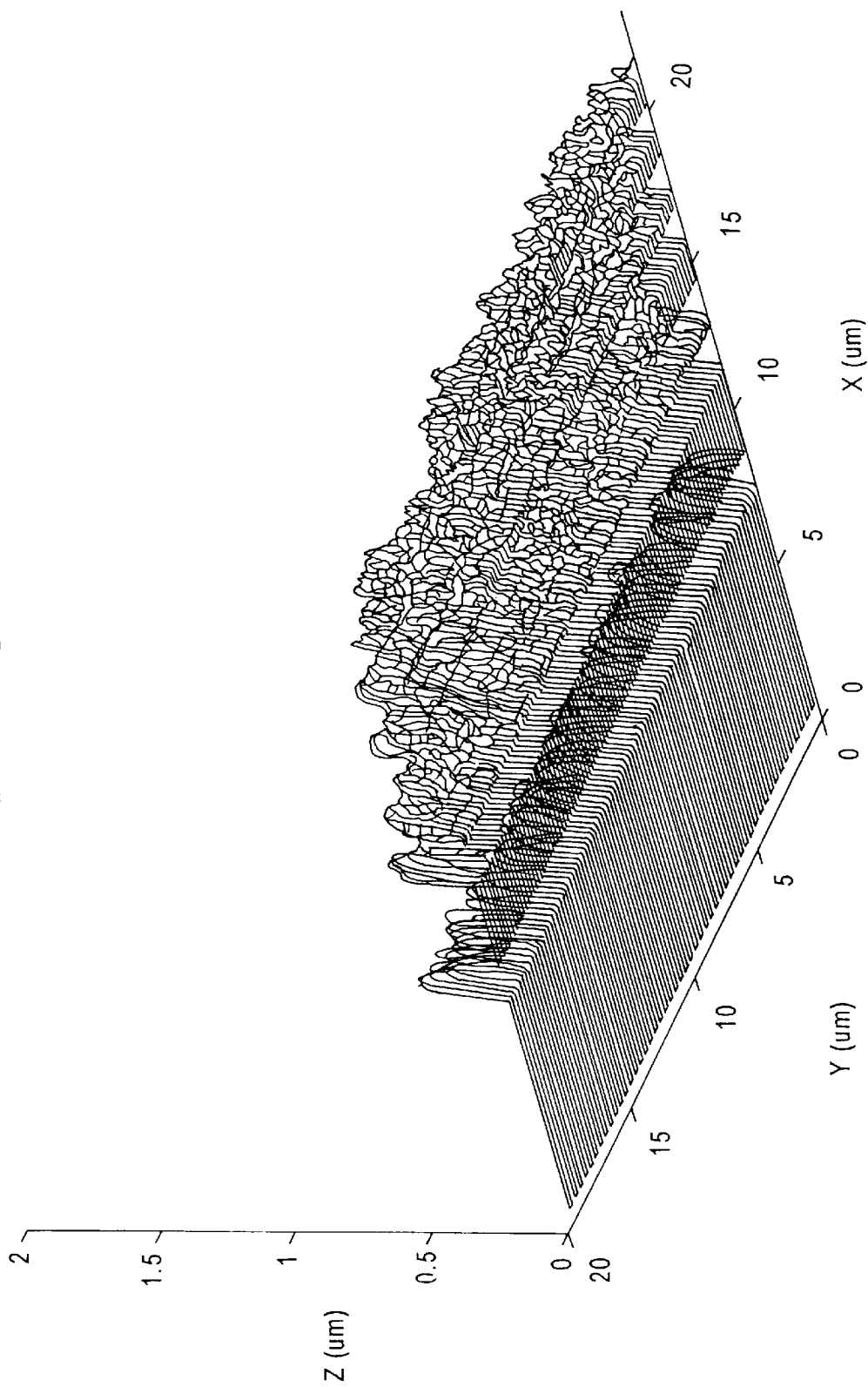

FIG. 8A and FIG. 8B illustrate three dimensional graphs of measurement results of the relative height differences for a scanning areas with 20 μm×20 μm of two arbitrary measuring objects. Referring FIG. 8a and FIG. 8B, it is recognized that there are considerable relative height differences in the overall surface of the measuring object.

As described above, the measuring method according to the present invention provides nondestructive measurement feature with less than 10 nanometer resolution and does not require vacuum environment. Variety of surface properties such as flatness, three dimensional parameters can be evaluated. In particular, in case of semiconductor wafer, three dimensional pattern characteristics such as depth profile of chemically processed IC can be measured for the quality control of wafer manufacturing processes.

The invention is in no way limited to the embodiment described hereinabove. Various modifications of disclosed embodiment as well as other embodiments of the invention will become apparent to persons skilled in the art upon reference to the description of the invention. It is therefore contemplate that the appended claims will cover any such modification or embodiments as fall within the true scope of the invention.

What is claimed is:

1. A non-contacting measuring method for three dimensional micro pattern in a measuring object comprising the steps of:

(a) forming light emitted from a source into slit-shaped light by means of an optical window;

(b) applying the slit-shaped light to a first scanning measurement line with a micro width of the measuring object with a plurality of surfaces which have step heights wherein each of the surfaces has three dimensional micro depth profile;

(c) finding a reference surface among the surfaces by passing the light reflected from the surfaces through a lens and capturing images of the surfaces on a screen wherein the reference surface is in focus on the screen;

(d) finding a reference position in the reference surface whose image is sharp in focus on the screen wherein images of the other positions except the reference position are blurred out of focus on the screen;

(e) measuring a size of the sharp image corresponding to the reference position and sizes of the images with blurred image corresponding to the other positions;

(f) calculating ratio values of the sizes of the images with the blurred image to the size of the sharp image corresponding to the reference position;

(g) obtaining relative height differences between the reference position and the other positions;

(h) establishing a relation equation between ratio value and relative height difference by the ratio values of the sizes of the images with the blurred image to the size of the sharp image and the relative height differences between the reference position and the other positions wherein the relation equation between the ratio value and the relative height difference is given as $\delta = C_1 - C_2/k$, where $C_1 = \alpha$ when $\alpha$ is distance from the lens to the reference position of the reference surface and $C_2 = \alpha \cdot b_2 / b_1$ when $b_1$ is a distance from the sharp image to the lens and $b_2$ are distances from the blurred image to the lens;

(i) obtaining all the values of the relative height differences between the reference position and the other positions by the established relation equation between the ratio value and the relative height difference; and (j) repeating said steps (f) and (i) while moving the measuring object until obtaining all the values of the relative height differences in overall scanning measurement area of the measuring object.

2. A method as recited as claim 1, wherein the reference surface is located at a lowermost height among the surfaces in said step of finding the reference surface among the surfaces, and the reference position is located at a lowermost height in the reference surface in said step of finding the reference position in the reference surface.

3. A method as recited as claim 1, wherein all the values of the relative height differences between the reference position and all the other positions in the scanning measurement area are simultaneously obtained along each scanning measurement line of the measuring object by the established relation equation between the ratio value and the relative height difference and by a line-scanning technique.

4. A non-contacting measuring method for three dimensional micro pattern in a measuring object comprising the steps of:

(a) forming light emitted from a source into slit-shaped light by means of an optical window;

(b) applying the slit-shaped light to a first scanning measurement line with a micro width of the measuring object;

(c) finding a reference position by passing the light reflected from the measuring object through a lens and capturing images on a screen whose image is sharp in focus on the screen wherein images of the other positions except the reference position are blurred out of focus on the screen;

(d) measuring a size of the sharp image corresponding to the reference position and sizes of the images with blurred image corresponding to the other positions;

(e) calculating ratio values of the sizes of the images with the blurred image to the size of the sharp image corresponding to the reference position;

(f) obtaining relative height differences between the reference position and the other positions;

(g) establishing a relation equation between ratio value and relative height difference by the ratio values of the sizes of the images with the blurred image to the size of the sharp image and the relative height differences between the reference position and the other positions wherein the relation equation between the ratio value and the relative height difference is given as $\delta = C_1 - C_2/k$, where $C_1 = \alpha$ when $\alpha$ is distance from the lens to the reference position of the reference surface and $C_2 = \alpha \cdot b_2/b_1$ when $b_1$ is a distance from the sharp image to the lens and $b_2$ are distances from the blurred image to the lens; and (h) obtaining all the values of the relative height differences between the reference position and all the other positions in overall scanning measurement area by the established relation equation between the ratio value and the relative height difference.

5. A non-contacting measuring method for three dimensional micro pattern in a measuring object comprising the steps of:

(a) forming light emitted from a source into slit-shaped light by means of an optical window;

(b) applying the slit-shaped light to a master specimen where all the relative height differences are known;

(c) selecting a reference position by passing the light reflected from the master specimen through a lens and capturing images on a screen whose image is sharp in focus on the screen wherein images of the other positions except the reference position are blurred out of focus on the screen;

(d) measuring a size of the sharp image corresponding to the reference position and sizes of the images with blurred image corresponding to the other positions;

(e) calculating ratio values of the sizes of the images with the blurred image to the size of the sharp image corresponding to the reference position;

(f) obtaining relative height differences between the reference position and the other positions which are known;

(g) establishing a relation equation between ratio value and relative height difference by the ratio values of the sizes of the images with the blurred image to the size of the sharp image and the relative height differences between the reference position and the other positions wherein the relation equation between the ratio value and the relative height difference is given us $\delta = C_1 \ C_2/k$, where $C_1 = \alpha$ when $\alpha$ is distance from the lens to the reference position of the reference surface and $C_2 = \alpha \cdot b_2/b_1$ when $b_1$ is a distance from the sharp image to the lens and $b_2$ are distances from the blurred image to the lens; and (h) obtaining all the values of the relative height differences between a reference position whose image is sharp in focus and all the other positions whose images are blurred out of focus in overall scanning measurement area of the measuring object by the established relation equation between the ratio value and the relative height difference and ratio values of sizes of the images with blurred image to a size of the sharp image corresponding to the reference position.

* * * * *